Figure 1:
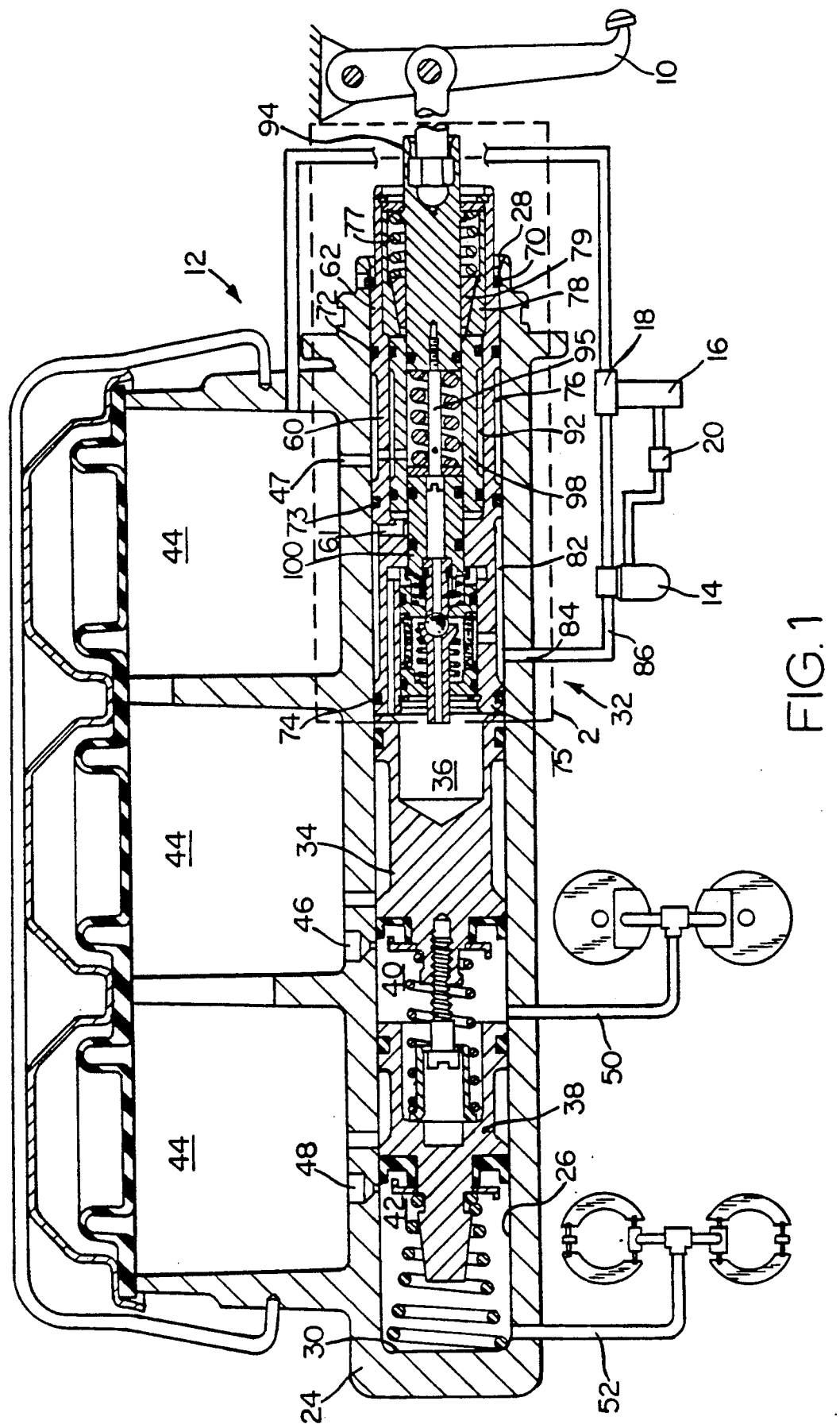

United States Patent [19]

Brown, Jr.

[11] Patent Number: 5,036,665

[45] Date of Patent: Aug. 6, 1991

[54] HYDRAULIC BRAKE BOOSTER

[75] Inventor: Arthur K. Brown, Jr., South Bend, Ind.

[73] Assignee: Allied-Signal Inc., Morristown, N.J.

[21] Appl. No.: 619,636

[22] Filed: Nov. 29, 1990

[51] Int. Cl.$^5$ ............................................. B60T 13/00
[52] U.S. Cl. ...................................... 60/550; 60/570; 60/582; 91/376 R
[58] Field of Search ................ 60/547.1, 550, 562, 60/548, 570, 582; 91/391 R, 370, 372, 373, 374, 369.1, 376 R

[56] References Cited

U.S. PATENT DOCUMENTS

| | | | |
|---|---|---|---|
| 3,237,410 | 3/1966 | Sogoian | 60/582 |
| 3,712,177 | 1/1973 | Bach et al. | 91/373 |
| 4,475,336 | 10/1984 | Runkle | 60/582 |
| 4,514,981 | 5/1985 | Brown et al. | 60/547.1 |
| 4,724,674 | 2/1988 | Fulmer | 60/570 |

*Primary Examiner*—Edward K. Look
*Assistant Examiner*—Hoang Nguyen
*Attorney, Agent, or Firm*—Larry J. Palguta; Ken C. Decker

[57] ABSTRACT

The hydraulic brake booster (12) of the present invention comprises a full power hydraulic brake booster (12) that provides false travel during full power operation and improved pedal feel during manual operation. The booster (10) has a housing (24) with a slidable sleeve assembly (60) therein, the assembly (60) housing a sleeve member (98) which is displaced by accumulator fluid pressure against a collet housing (78) and a moveable collet member (79) located about an input member (94). The sleeve member (98) displaces the moveable collet member (79) against a resilient member (77) when the sleeve member (98) is displaced by hydraulic fluid pressure from the accumulator (14). In the absence of hydraulic fluid pressure, the spring member (77) displaces the moveable collet member (79) against the sleeve member (98) so that the moveable collet member (79) is trapped tightly between the collet housing (78) and input member (94) in order to couple the input member (94) with the sleeve assembly (60) for conjoint movement in the booster housing bore (26).

10 Claims, 2 Drawing Sheets

HYDRAULIC BRAKE BOOSTER

The present invention relates generally to hydraulic brake boosters, and in particular to hydraulic brake boosters with improved false travel during hydraulic operation.

The hydraulic brake booster of the present invention relates to a booster commonly referred to as a "full-power" brake booster. Such brake boosters are disclosed in U.S. Pat. Nos. 4,441,319; 4,490,977; 4,514,981; 4,665,701; 4,685,297; 4,704,867; and 4,724,674. In a "full-power" brake booster, an accumulator is charged with fluid pressure for selective use in providing a power assist. The accumulator is communicated to a booster housing and a valve assembly is operable to control communication of fluid pressure from the accumulator to a power chamber wherein the fluid acts against at least one piston to communicate fluid from the housing to a brake circuit. The valve assembly is enclosed within a sleeve assembly and an input member is moveable relative to the sleeve assembly to control operation of the valve assembly. In order to provide pedal travel for a full power brake booster, a loss motion connection between the input member and the pedal assembly has been provided. The loss motion connection requires modification of the pedal assembly or the input member to accommodate or carry a resilient member therebetween, such as illustrated in U.S. Pat. No. 4,490,977. In order to improve the pedal feel of full power hydraulic brake boosters, generally one of two types of mechanisms have been utilized, usually full stroke devices or false travel devices. Ratio changers and quick take-up devices have also been employed. Full stroke type hydraulic brake boosters provide a good compromise of proportional feel and pedal travel. However, there are times when less pedal stroke during power operation would be desirable. Generally, the false travel hydraulic brake boosters provide the shorter power strokes desired but lack the proportional feel of the full stroke devices. Another disadvantage of false travel mechanisms is that the stroke used to apply the booster during power operation is lost during manual operations. This necessitates raising the pedal which is also undesirable. Another solution for the pedal stroke and pedal heighth loss problem during manual operation is to use a stroke locking device during manual operation. The present invention provides an improvement for the pedal feel and manual stroke loss problems of current false travel hydraulic brake boosters. The present invention provides a brake apply effort that is proportional to the brake pressure, the same as with full stroke type boosters, and can be changed by changing a reaction area diameter, the same as with full stroke hydraulic boosters. The stroke is also proportional to the brake pressure and can be changed by changing a spring rate. Practically any stroke can be easily provided by simple modification in order to meet customer requirements. A collet type lock is used on the input rod to correct the manual stroke and pedal heighth loss problems. When hydraulic pressure is stored in the accumulator, the collet lock is in a released position. When hydraulic pressure has been lost in the accumulator, a spring actuates the collet to lock the input rod to the sleeve assembly so that the entire assembly will move as a unit as the brake is applied manually.

The present invention accomplishes the above solutions by providing a hydraulic brake booster, a connection with an accumulator means for storing fluid pressure used selectively during braking to provide a power assist, a booster housing forming a housing bore communicating with the accumulator means, a pair of pistons moveable within the bore to communicate fluid from the bore to respective brake circuits during braking, a sleeve assembly disposed within the bore and cooperating with one of the pistons to form a power chamber, the sleeve assembly carrying a pair of valve members one of which normally closes communication between the power chamber and the accumulator means and the other normally venting the power chamber to a reservoir, an input member cooperating with the pair of valve members to move the valve members during braking such that the one valve member communicates the accumulator means with the power chamber and the other valve member closes communication between the power chamber and the reservoir, the sleeve assembly including an interior bore having an axially moveable sleeve member disposed therein, the input member disposed within the interior bore, the interior bore including a normally stationary collet housing and a moveable collet member biased by resilient means toward the sleeve member, the sleeve member abutting the moveable collet member, so that a predetermined fluid pressure level received from said accumulator means displaces said sleeve member against said moveable collet member such that the input member is free to move axially relative to the sleeve assembly, and an absence of the predetermined fluid pressure level from the accumulator means permitting the resilient means to displace axially the moveable collet member and sleeve member such that the moveable collet member couples the input member with the sleeve assembly for movement therewith.

Figure 2:
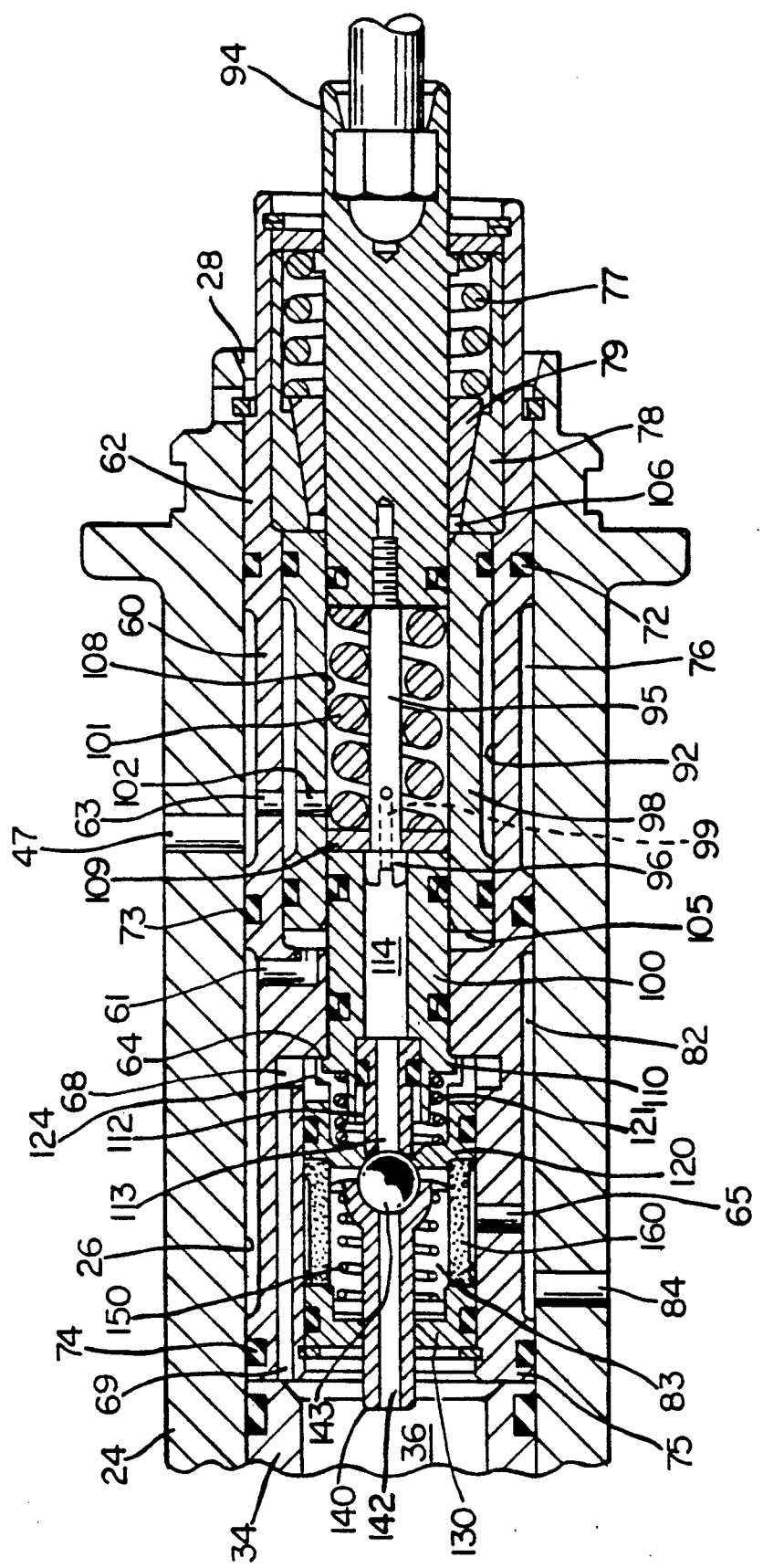

The invention will now be described with reference to the accompanying drawings which illustrate an embodiment of the invention in which:

FIG. 1 is a brake system with the full power hydraulic brake booster of the present invention shown in cross section; and FIG. 2 is an enlarged partial view of FIG. 1.

The brake system in FIGS. 1 and 2 includes a brake pedal 10 coupled to a brake booster 12 and an accumulator 14 charged with fluid pressure by an electric motor 16 driving a pump 18. In order to maintain the fluid pressure within accumulator 14 above a predetermined pressure level, an electronic control unit 20 with a pressure sensitive switch is provided between accumulator 14 and electric motor 16 to control operation of motor 16 and pump 18.

Brake booster 12 provides a housing 24 defining a uniform diameter housing bore 26 extending from opening 28 at one end of housing 24 to an end wall 30 at the other end of housing 24. A valve assembly 32 is disposed at one end of the housing in bore 26. First piston 34 is disposed within bore 26 and cooperates with valve assembly 32 to form a power chamber 36. A second piston 38 cooperates with first piston 34 to form a first pressure chamber 40 and also cooperates with end wall 30 to form a second pressure chamber 42. Housing 24 defines a multisection reservoir 44 which communicates fluid via compensation ports 46 and 48 with chambers 40 and 42, respectively. Fluid communicated from the reservoir to chambers 40 and 42 is pressurized during braking, in a manner to be described hereinafter, to communicate fluid pressure to the respective brake circuits 50 and 52. Valve assembly 32 includes a one piece sleeve assembly 60 with end 62 abutting a snap ring 70 fixedly disposed at opening 28. Sleeve assembly 60 carries a seal 72 adjacent snap ring 70, a seal 73 at its midportion adjacent return opening 47, and seal 74 adjacent end 75. Adjacent return opening 47 is sleeve recessed area 76 which defines, with seals 72, 73, a return chamber providing for fluid flow to the reservoir via return opening 47. Seals 73 and 74 define an inlet chamber 82 which communicates with accumulator 14 via inlet 84 and conduit 86. End 75 of sleeve assembly 60 abuts piston 34 to form therewith power chamber 36.

Sleeve assembly 60 forms a stepped interior bore 92 receiving moveably an input member 94, a sleeve member 98, a normally stationary collet housing 78, a moveable collet member 79, resilient means 77, and sleeve piston 100. Input member 94 includes an input rod 95 extending to head 96 which receives a washer 99 engaged by a resilient member 101. Head 96 and rod 95 include fluid flow opening 99. Input member 94 is slidably received within interior opening 108 of sleeve member 98. Sleeve member 98 includes a radial opening 102 aligned approximately with radial opening 63 of sleeve assembly 60, both openings being aligned approximately with return opening 47. Sleeve assembly 60 includes a radial opening 61 which communicates with chamber 82 so that a predetermined fluid pressure level received from accumulator 14 is trnasmitted to end 105 and displaces sleeve member 98. Sleeve member 98 abuts collet housing 78 and moveable collet member 79 at collet openings 106 in order to compress resilient means 77. Sleeve assembly 60 houses slidably sleeve piston 100 which includes a radial extension 110 that may abut shoulder 64 of assembly 60. A valve seat 120 houses one end of spring member 121 which also biases sleeve piston 100. Sleeve piston 100 includes an end valve extension 112 having a central opening 113 communicating with a central opening 114 of sleeve piston 100. An end member 130 disposed fixedly within sleeve assembly 60 houses slidably a first valve member 140 that includes a central opening 142 and a ball valve 143. End member 130 seats a spring 150 which biases ball valve 143 into engagement with valve seat 120. A filter 160 is disposed between end member 130 and valve seat 120, fluid pressure from accumulator 14 being received at radial opening 65 of sleeve assembly 60. Sleeve assembly 60 includes assembly power chamber 68 which can receive fluid pressure from the accumulator via an opened valve seat 120 and transmits it via axial sleeve assembly passage 69 to power chamber 36.

During full power brake operation, accumulator 14 provides the predetermined fluid pressure level via openings 84 and 65 to chamber 83 between end member 130 and valve seat 120. When the vehicle operator steps on pedal 10, input member 94 will move initially to the left so that radial extension 110 of sleeve piston 100 is displaced away from shoulder 64 and toward valve seat shoulder 124. This also causes valve extension 112 to engage ball valve 143 and move it away from valve seat 120 so that pressure from the accumulator passes through valve seat 120 to assembly power chamber 68, axial sleeve assembly passage 69 and power chamber 36. Because fluid pressure from accumulator 14 is received within chamber 82 and acts against the enlarged diameter portion of sleeve assembly 60 at seal 73, and also against end 75 of sleeve assembly 60, sleeve assembly 60 remains motionless during normal power operation of the hydraulic brake booster. Input member 94 is moved to the left so that resilient member 101 and washer 99 displace sleeve piston 100 and valve extension 112 against ball valve 143. When valve extension 112 engages ball valve 143, the return fluid flow path to the reservoir through central opening 113 is closed off. In other words, central openings 113 and 114, interior opening 108, radial openings 102 and 63, and return opening 47 do not receive fluid. The fluid pressure from the accumulator flows from passage 84 via valve seat 120 to power chamber 36 in order to actuate pistons 34, 38. The preloads of resilient member 101, spring member 121, and spring 150 are such that when input member 94 is actuated or moved to the left, spring 150 collapses first, spring member 121 collapses second, and resilient member 101 collapses last.

When the predetermined fluid pressure level is not provided by accumulator 14, due to either a failure of the accumulator or the fluid pressure system, then sleeve member 98 is no longer displaced by the fluid pressure level against moveable collet member 79. Resilient means 77 biases moveable collet member 79 and sleeve member 98 to the left so that moveable collet member 79 is wedged or trapped between collet housing 78 and input member 94. This effectively couples input member 94 with sleeve assembly 60 so that there is conjoint movement. As the vehicle operator depresses the brake pedal, the lost motion or false travel formerly present during full power hydraulic operation is absent, and sleeve assembly 60 is displaced to the left so that it displaces the abutting first piston 34 and effects, via pistons 34 and 38, the manual transmission of pressure to brake assemblies 50 and 52.

I claim:

1. In a hydraulic brake booster, a connection with accumulator means for storing fluid pressure used selectively during braking to provide a power assist, a booster housing forming a housing bore communicating with the accumulator means, a pair of pistons moveable within the bore to communicate fluid from the bore to respective brake circuits during braking, a sleeve assembly disposed within the bore and cooperating with one of the pistons to form a power chamber, the sleeve assembly carrying a pair of valve members one of which normally closes communication between the power chamber and the accumulator means and the other normally venting the power chamber to a reservoir, an input member cooperating with the pair of valve members to move the valve members during braking such that the one valve member communicates the accumulator means with the power chamber and the other valve member closes communication between the power chamber and the reservoir, the sleeve assembly including an interior bore having an axially moveable sleeve member disposed therein, the input member disposed within the interior bore, the interior bore including a normally stationary collet housing and a moveable collet member biased by resilient means toward the sleeve member, the sleeve member abutting the moveable collet member, so that a predetermined fluid pressure level received from said accumulator means displaces said sleeve member against said moveable collet member such that the input member is free to move axially relative to the sleeve assembly, and an absence of the predetermined fluid pressure level from the accumulator means permitting the resilient means to displace axially the moveable collet member and sleeve member such that the moveable collet member couples the input member with the sleeve assembly for movement therewith.

2. The hydraulic brake booster in accordance with claim 1, wherein said sleeve assembly includes an opening which communicates said pressure level with an end of said sleeve member.

3. The hydraulic brake booster in accordance with claim 1, wherein the input member includes an axial rod extending therefrom and a spring member located between an end of the rod and said input member.

4. The hydraulic brake booster in accordance with claim 3, further comprising a sleeve piston disposed within said sleeve member and engaged by said rod, the sleeve piston having an interior opening and engageable with said one valve member.

5. The hydraulic brake booster in accordance with claim 4, wherein said sleeve piston includes an end extension having an extension opening and a valve seat at one end forming part of the other valve member, the extension opening and interior opening providing communication with a fluid flow return path to said reservoir.

6. The hydraulic brake booster in accordance with claim 5, wherein said booster housing, sleeve assembly, and sleeve member have radial openings which communicate with the interior opening of said sleeve piston.

7. The hydraulic brake booster in accordance with claim 6, wherein a spring member is disposed about an end of said sleeve piston and engages a valve seat of said one valve.

8. The hydraulic brake booster in accordance with claim 7, wherein an end member is disposed within said sleeve assembly and slidably receives a ball valve of said one valve member.

9. The hydraulic brake booster in accordance with claim 8, wherein said ball valve is biased by second resilient means extending between said end member and said ball valve.

10. The hydraulic brake booster in accordance with claim 9, wherein filter means is located between said end member and said valve seat of the one valve.

* * * * *